(12) United States Patent
Gorman

(10) Patent No.: US 7,572,977 B2
(45) Date of Patent: *Aug. 11, 2009

(54) UNIVERSAL ELECTRICAL WIRING COMPONENT

(75) Inventor: Michael P. Gorman, Laguna Niguel, CA (US)

(73) Assignee: ProtectConnect, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/782,082

(22) Filed: Jul. 24, 2007

(65) Prior Publication Data

US 2008/0020632 A1    Jan. 24, 2008

Related U.S. Application Data

(63) Continuation of application No. 10/924,555, filed on Aug. 24, 2004, now Pat. No. 7,312,396.

(60) Provisional application No. 60/552,546, filed on Mar. 13, 2004.

(51) Int. Cl.
*H01H 9/02* (2006.01)

(52) U.S. Cl. .................... 174/58; 174/60; 174/480; 220/3.8; 248/906

(58) Field of Classification Search ............... 174/50, 174/58, 60, 63, 48; 248/906, 298.1, 219.1; 29/729; 220/3.7, 3.8; 439/535–537, 107, 439/652; 200/330
See application file for complete search history.

(56) References Cited

U.S. PATENT DOCUMENTS 5,012,043 A * 4/1991 Seymour ............... 174/57
6,956,169 B1 * 10/2005 Shotey et al. ............. 174/58

* cited by examiner

*Primary Examiner*—Dhiru R Patel
(74) *Attorney, Agent, or Firm*—Knobbe, Martens, Olson & Bear, LLP

(57) ABSTRACT

A modular electrical wiring component comprises a wiring module having a wiring portion for coupling to a source of electrical power and a user-accessible portion configured to accept and provide electrical power to a functional module that provides a selected electrical distribution function, wherein the wiring module is configured to accept the functional module without access to the wiring portion. The modular electrical wiring component also comprises an adjustable plaster ring configured to couple to the wiring module and to an electrical junction box, wherein the adjustable plaster ring provides a variable distance between the electrical junction box and the wiring module.

12 Claims, 14 Drawing Sheets

UNIVERSAL ELECTRICAL WIRING COMPONENT

CROSS-REFERENCE TO RELATED APPLICATIONS

This application is a continuation of co-pending U.S. application Ser. No. 10/924,555 filed Aug. 24, 2004 and entitled "Universal Electrical Wiring Component," which claims priority from U.S. Provisional Application No. 60/552,546 filed Mar. 13, 2004 and entitled "Modular Integrated Wiring System," both of which are incorporated by reference in their entirety.

BACKGROUND OF THE INVENTION

Conventional AC electrical systems are comprised of a junction box and an electrical device, such as an outlet or switch, installed within the box. During a rough-in phase of construction, power cables are routed through building framing to junction boxes mounted at predetermined electrical distribution locations. The power cables are fed through openings in the rear or sides of the junction boxes and folded back inside, unterminated, so as to be out of the way until the next phase. During a makeup phase, wall panels are installed and painted, and electrical devices are installed into the boxes. After conductors are wired to an electrical device, it and the attached conductors are pushed into the electrical box and the device is attached to the top and bottom of the box. During a trim phase, face plates are mounted over the open-end of the junction boxes, completing the conventional electrical wiring process.

SUMMARY OF THE INVENTION

Conventional electrical wiring installation is a logistical nightmare of schedules, inventory, design changes and rework to correct design and installation errors and product defects. Prefabricated units having brackets with pre-mounted junction boxes and pre-wired outlets and switches installed within the boxes are sometimes utilized in an effort to save installation time. These units are manufactured per contractor specification and delivered to the job site. An electrician attaches a particular unit at a specific location and attaches a corresponding power cable to a standard connector.

Such prefabricated electrical systems, however, do not solve all of the logistical problems associated with electrical wiring system design and installation and create additional ones. Each prefabricated unit is typically specified as to mounting height, plaster ring depth, support arm length and electrical device type, to name a few, and are given unique part numbers. Each part number represents a different stock keeping unit (SKU) for the distributor and contractor. The contractor must sort each SKU to corresponding installation locations at the job site. If an SKU malfunctions, there is typically no replacement part, and the SKU has to be returned to the manufacturer. Each prefabricated part is custom made so there is much room for mistakes to be made in the specification and assembly process. If an electrician opens the SKU to fix a problem inside, the product warranty may be void.

A universal electrical wiring component advantageously combines an adjustable, modular mount with modular electrical devices to reduce installation costs over conventional wiring in much the same manner as a typical prefabricated system. Because a universal electrical wiring component is modular, a limited number of such components can be combined and configured as a substitute for many conventional assemblies. This significantly reduces the number of SKUs and associated inventory and planning headaches. Because a universal wiring component is adjustable, it greatly reduces specification requirements and eliminates the possibility of assembly errors associated with custom prefabricated parts. A universal electrical wiring component also advantageously accommodates design changes including the location and the type of an electrical distribution point and the function and color of an installed electrical device. Testing of the wiring system can be accomplished at the rough-in phase while walls are open rather than the trim-out phase. Trim-out can be completed without touching a wire. Devices can finish flush with the wall every time.

DETAILED DESCRIPTION OF THE PREFERRED EMBODIMENTS

Figure 1:
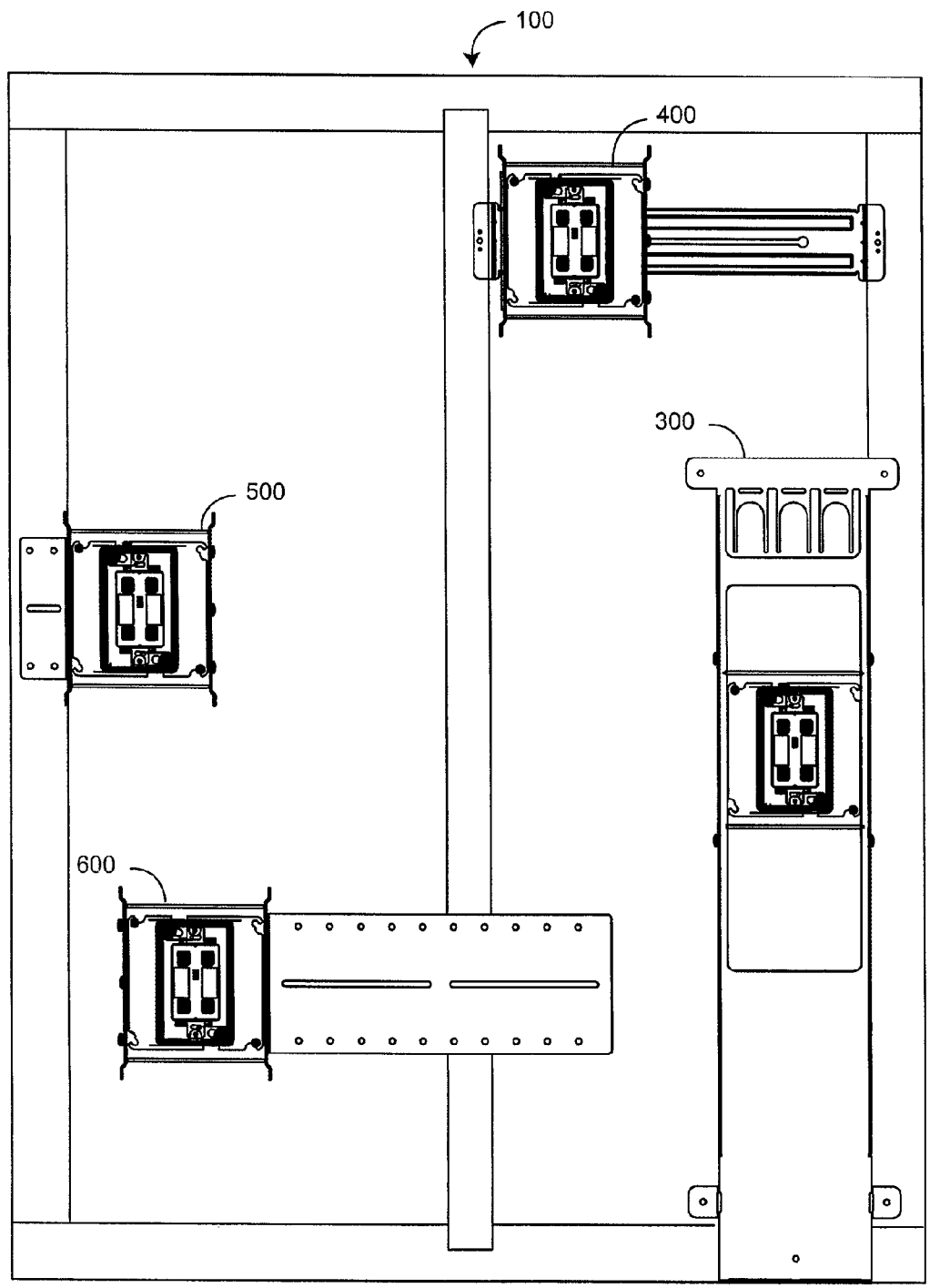
FIG. 1 is a front view of a modular integrated wiring system utilizing various embodiments of a universal electrical wiring component.

FIG. 1 illustrates a modular integrated wiring system 100 utilizing universal electrical wiring component embodiments 300-600. A floor bracket component 300, a stud bracket component 400, a box bracket component 500 and an extended box bracket 600 are included, providing adaptability for different electrical power distribution designs. Each wiring component 300-600 provides mounting flexibility by adjusting to various wall dimensions, stud configurations, and electrical distribution point locations. Specifically, each component 300-600 has an adjustable depth into the wall, guaranteeing a flush finish with the wall surface at every electrical distribution point. In addition, the floor bracket component 300 provides an adjustable height. The stud bracket component 400 can be positioned at any height and provides an adjustable distance between studs. The box bracket component 500 can be positioned at any height, and the extended box bracket component 600 can be positioned at any height and at various locations between studs. Further, each wiring component 300-600 accommodates a variety of functional modules, including various outlets, switches, GFCI devices, and motion detectors to name few. Advantageously, the color of the functional modules and even some functionality can be readily changed at anytime without rewiring, as described below. The resulting modular integrated wiring system 100 has the labor saving advantages of prefabrication with the design and installation flexibility of individually configured and wired components.

A universal electrical wiring component combining modular electrical devices and an adjustable, modular mount is described with respect to FIG. 2, below. A floor bracket component 300 is described in further detail with respect to FIG. 3, below. A stud bracket component 400 is described in further detail with respect to FIG. 4, below. A box bracket component 500 is described in further detail with respect to FIG. 5, below, and an extended box bracket component 600 is described in further detail with respect to FIG. 6, below. Adjustable mounts are described in detail with respect to FIGS. 7-11, below.

Figure 2:
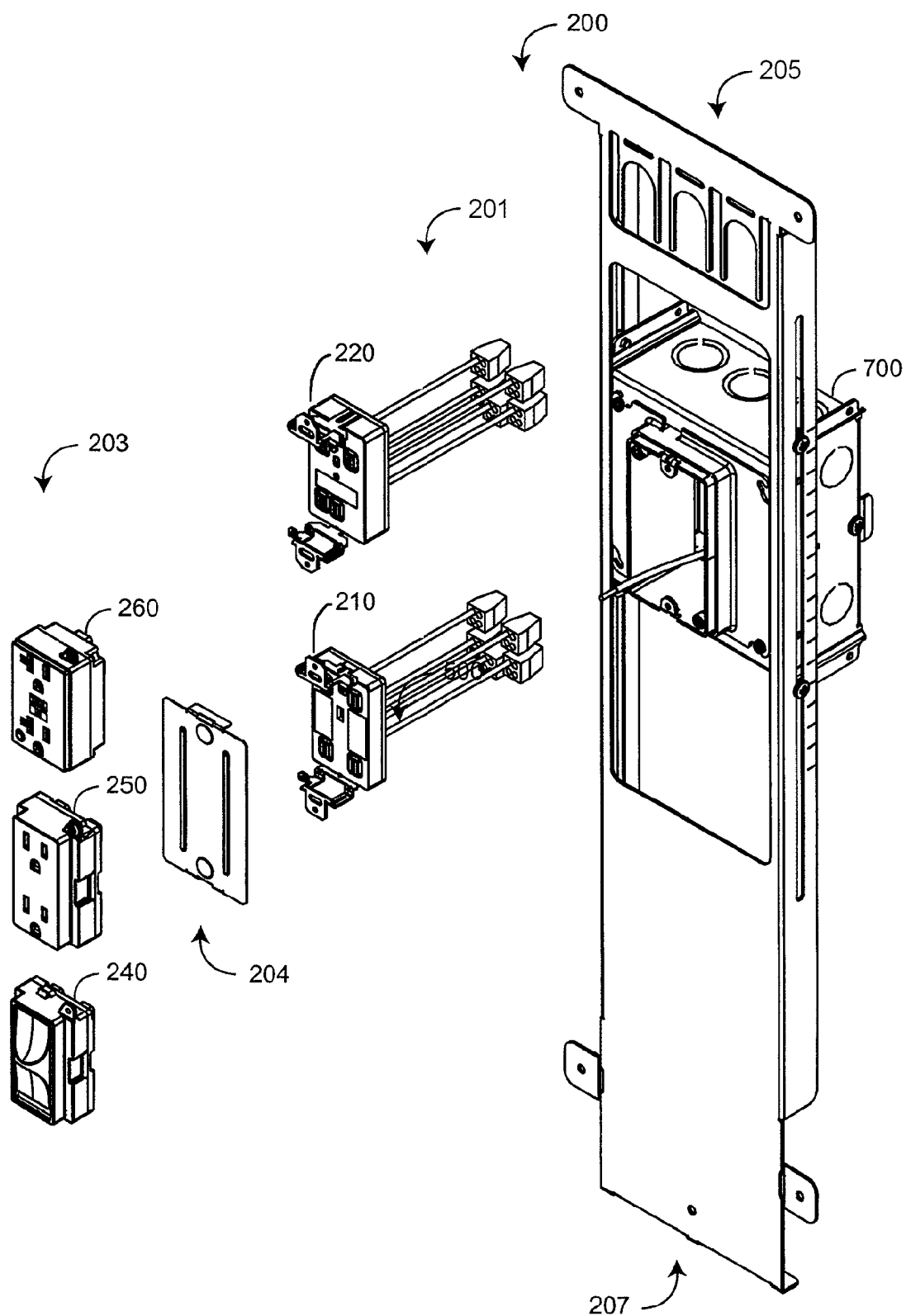
FIG. 2 is a front perspective exploded view of a universal electrical wiring component having modular electrical devices combined with an adjustable, modular mount.

FIG. 2 further illustrates a universal electrical wiring component 200 having an adjustable mount 205 combined with a wiring module 201. The adjustable mount 205 includes a bracket 207 and a box assembly 700. The bracket 207 can be, for example, a vertically adjustable floor bracket 800 (FIG. 8), a horizontally adjustable stud bracket 900 (FIG. 9), a box bracket 1000 (FIG. 10), or an extended box bracket 1100 (FIG. 11). The box assembly 700 is mounted to the bracket 207 and the wiring module 201 is mounted in the box assembly 700. The wiring module 201 may be a regular wiring module 210 or a GFCI wiring module 220. The adjustable mount 205 is configured to position the wiring module 201 at any of various locations within a building wall. The wiring module 201 is configured to connect to a source of electrical power and to removably accept a functional module 203. Advantageously, the combination of adjustable mount and wiring module form a universal electrical wiring component that can implement a variety of electrical distribution points of an electrical system. For example, a universal electrical wiring component can accept various outlet modules 250-260 and can be adjusted to implement a wall outlet. As another example, a universal electrical wiring component can accept various switch modules 240 and can be adjusted to implement a switch outlet. A universal electrical wiring component 200 may be, for example, a floor bracket component 300 (FIG. 3), a stud bracket component 400 (FIG. 4), a box bracket component 500 (FIG. 5) or an extended box bracket component 600 (FIG. 6). A cover 204 may be used to protect a wiring module 201 from damage prior to functional module installation.

Figure 3:
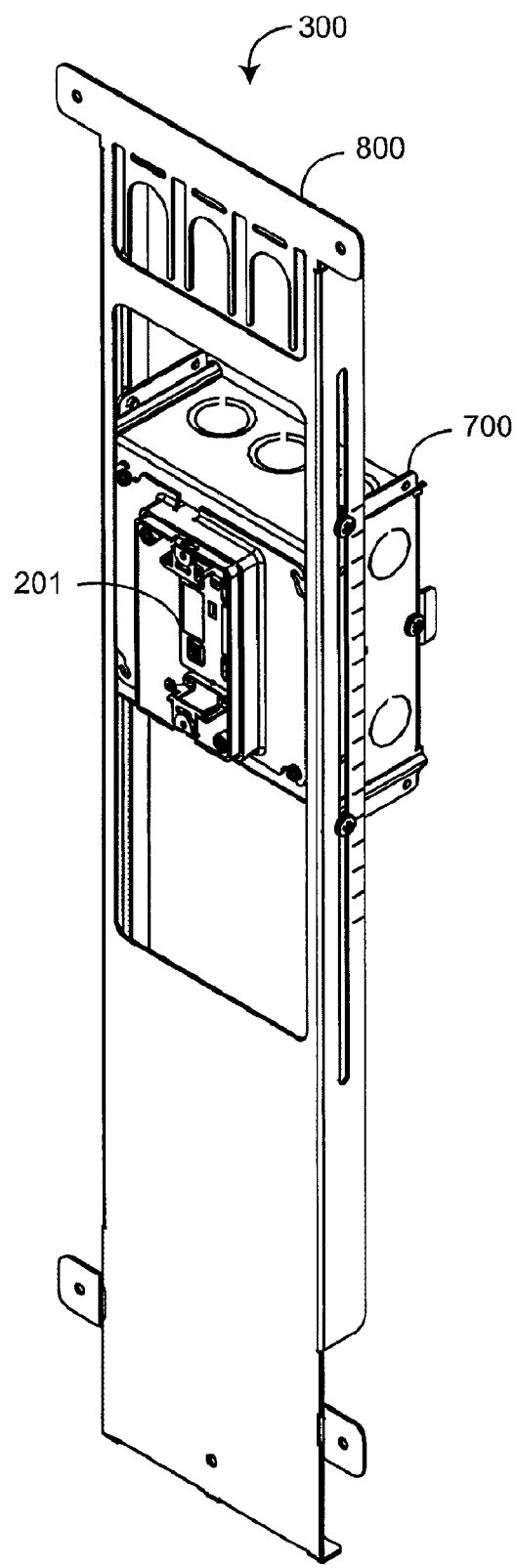
FIG. 3 is a front perspective view of a floor bracket electrical wiring component.

FIG. 3 illustrates a floor bracket component 300 having a wiring module 201 and an adjustable mount comprising a box assembly 700 and a floor bracket 800. In this embodiment, the floor bracket 800 provides the wiring module 201 an adjustable height from the floor and the box assembly 700 provides the wiring module 201 an adjustable distance from the box assembly 700 for a flush position with a wall surface.

Figure 4:
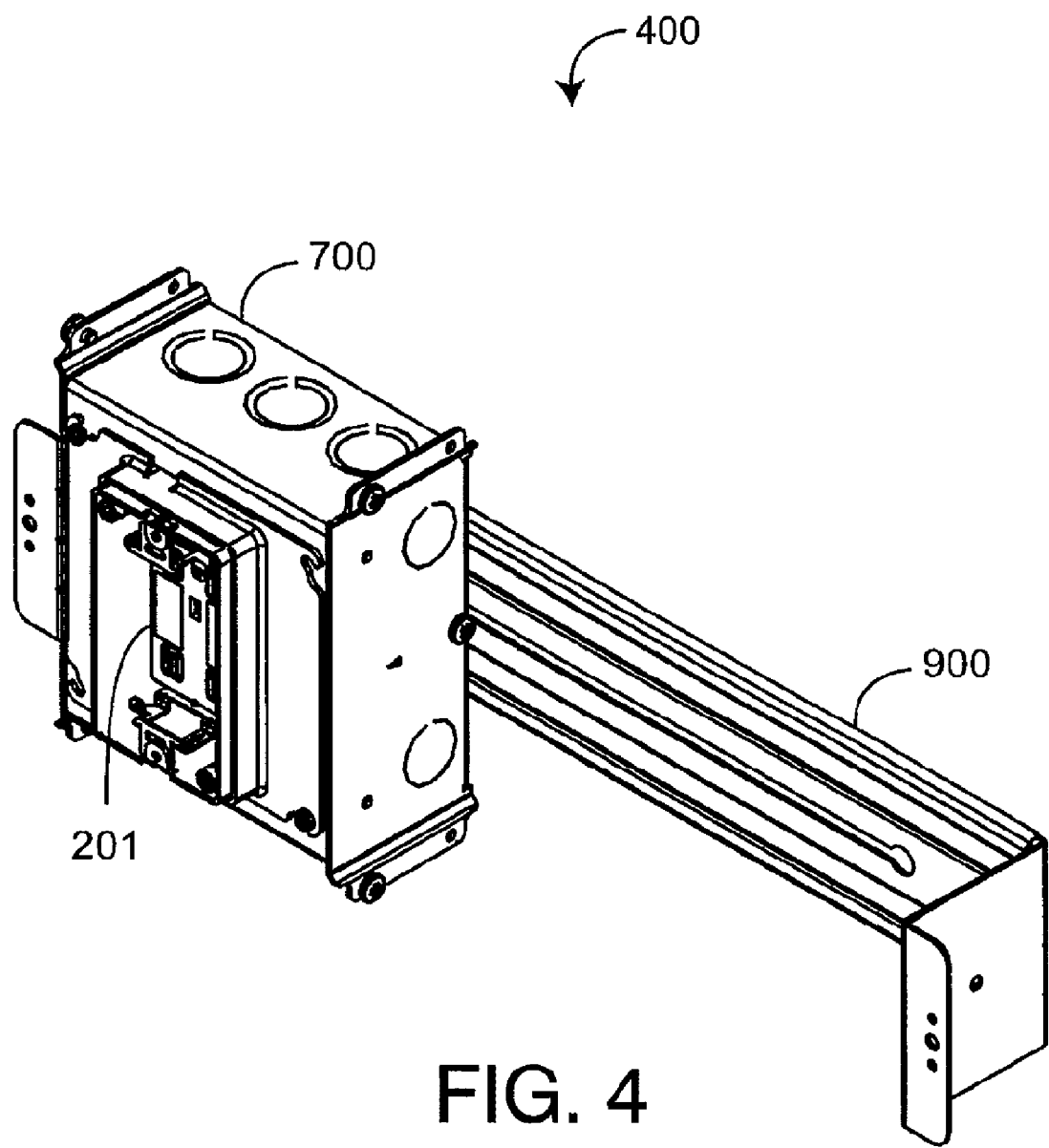
FIG. 4 is a front perspective view of a stud bracket electrical wiring component.

FIG. 4 illustrates a stud bracket component 400 having a wiring module 201 and an adjustable mount comprising a box assembly 700 and a stud bracket 900. In this embodiment, the stud bracket 900 provides the wiring module 201 an adjustable distance between studs and the box assembly 700 provides the wiring module 201 an adjustable distance from the box assembly 700 for a flush position with a wall surface.

Figure 5:
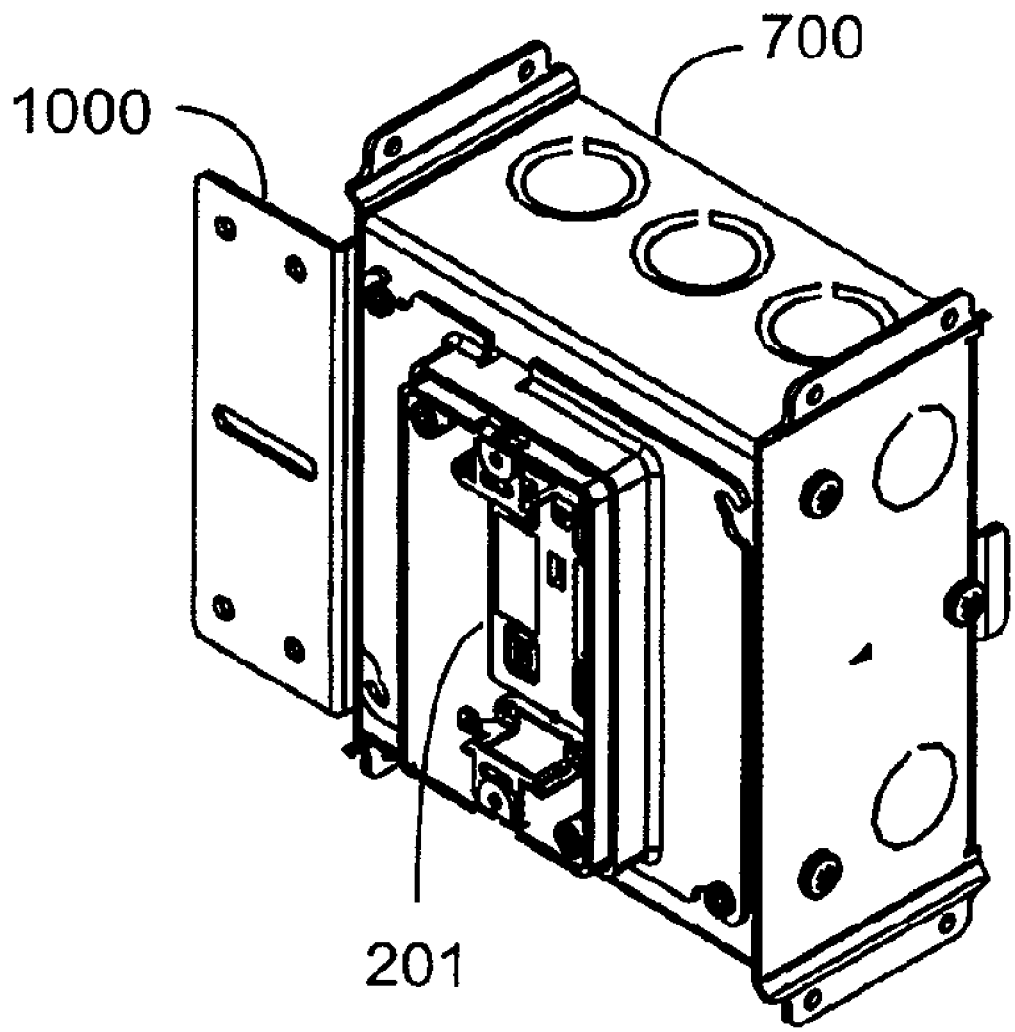
FIG. 5 is a front perspective view of a box bracket electrical wiring component.
Figure 6:
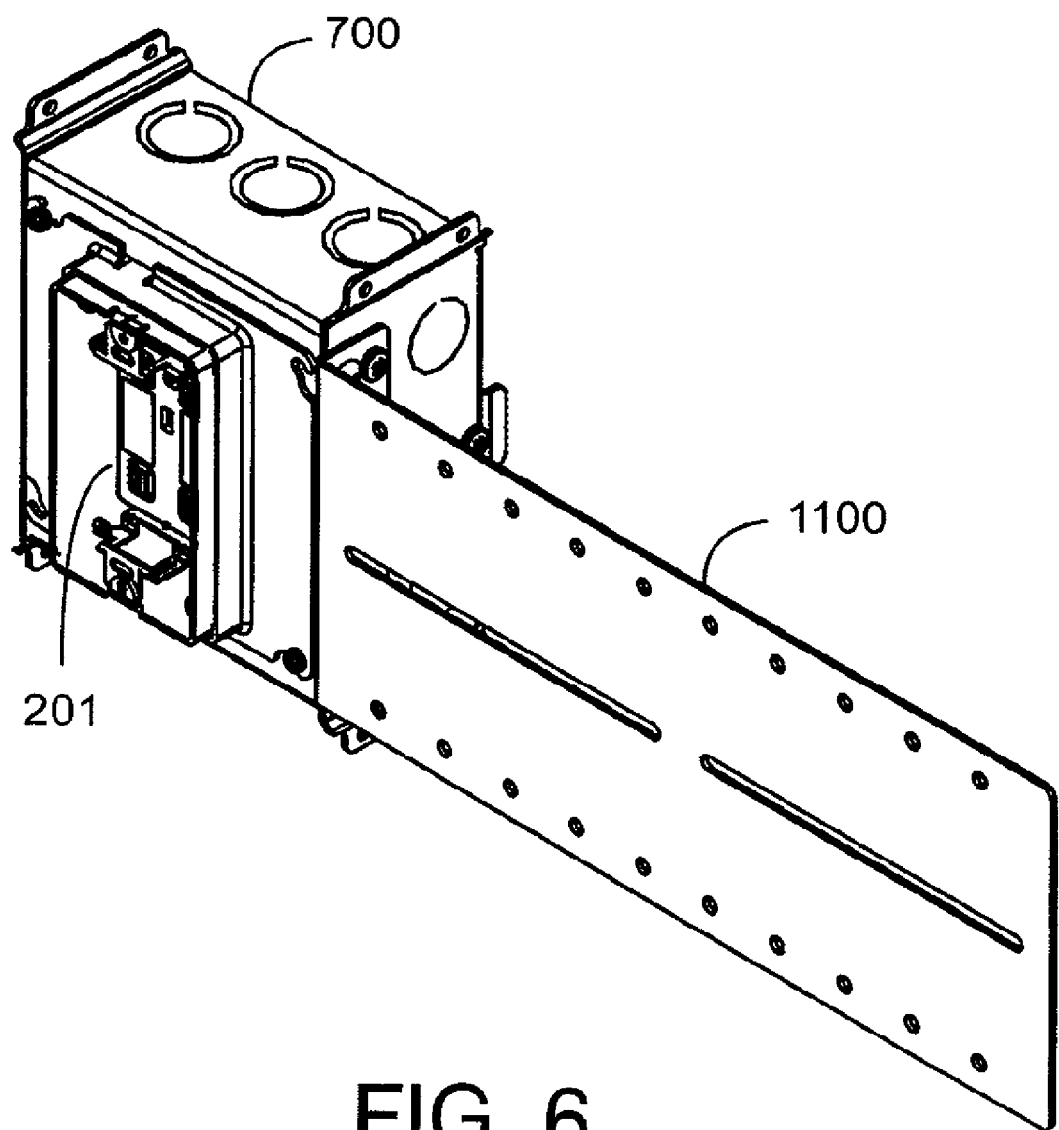
FIG. 6 is a front perspective view of an extended box bracket electrical wiring component.

FIG. 5 illustrates a box bracket component 500 having a wiring module 201 and an adjustable mount comprising a box assembly 700 and a box bracket 1000. In this embodiment, the box bracket 1000 allows positioning of the wiring module 201 along a vertical stud. Also, the box assembly 700 provides the wiring module 201 an adjustable distance from the box assembly 700 for a flush position with a wall surface.

FIG. 6 illustrates an extended box bracket component 600 having a wiring module 201 and an adjustable mount comprising a box assembly 700 and an extended box bracket 1100. In this embodiment, the extended box bracket 1100 allows vertical positioning of the wiring module 201 along a stud and horizontal positioning between studs. Also, the box assembly 700 provides the wiring module 201 an adjustable distance from the box assembly 700 for a flush position with a wall surface.

Figure 7:
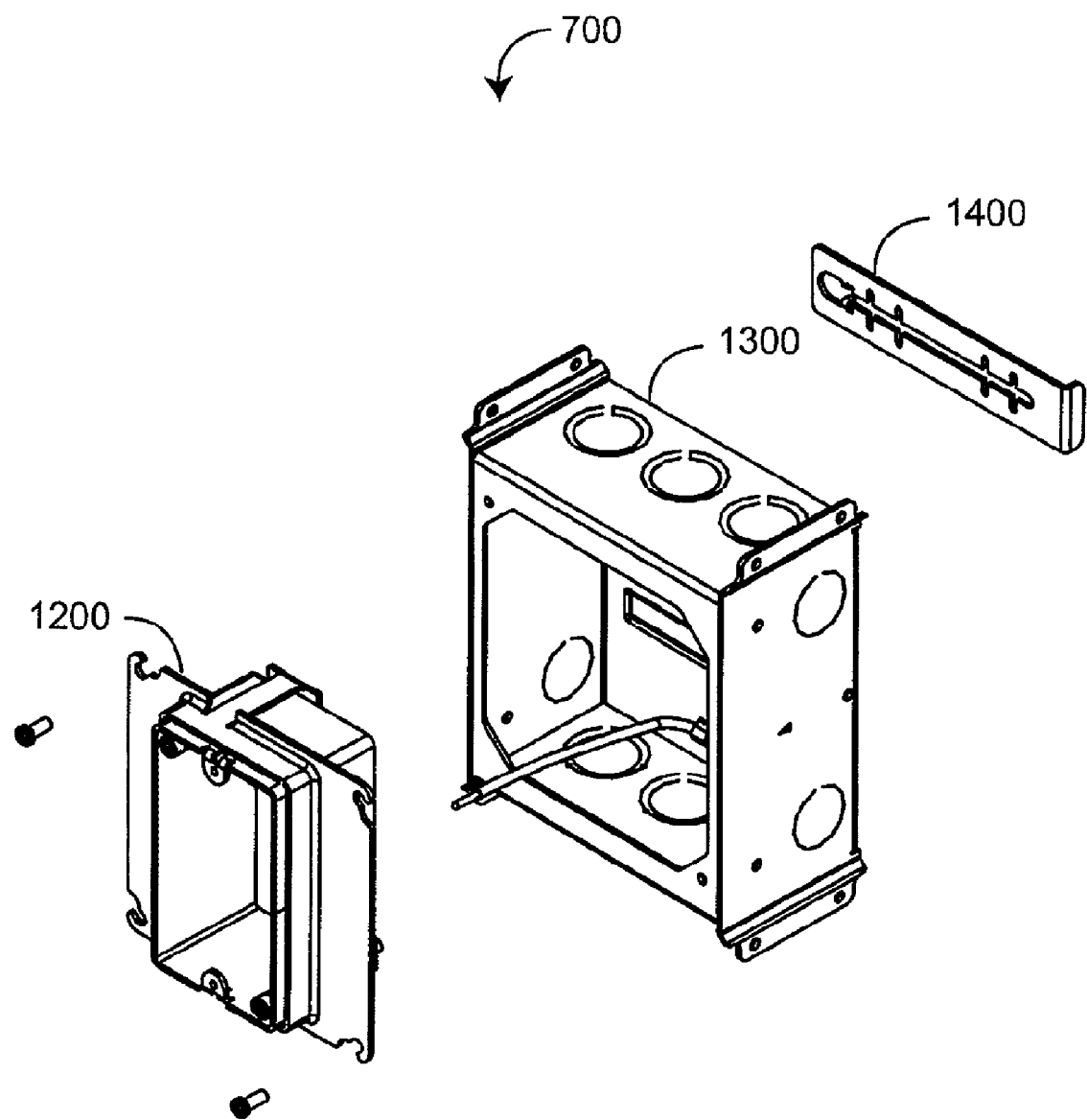
FIG. 7 is an exploded perspective view of a junction box assembly.

FIG. 7 illustrates a box assembly 700 having a junction box 1300, an adjustable plaster ring 1200 and a support arm 1400. The plaster ring 1200 removably attaches to the junction box 1300 and a wiring module 201 (FIG. 2) attaches to the plaster ring 1200. The plaster ring provides the wiring module 201 (FIG. 2) with an adjustable distance from the junction box 1300, as described in detail with respect to FIG. 12. The junction box 1300 advantageously has an attached ground wire that can be quickly connected to a wiring module 201 (FIG. 2). The plaster ring 1200 has slotted fastener apertures so that the plaster ring 1200 along with an attached wiring module can be removed from, and reattached to, the junction box 1300 by merely loosening and tightening, respectively, the fasteners. The support arm 1400 attaches to the back of the junction box to provide support against an inside wall surface, as described in further detail with respect to FIGS. 14A-D, below.

Figure 8:
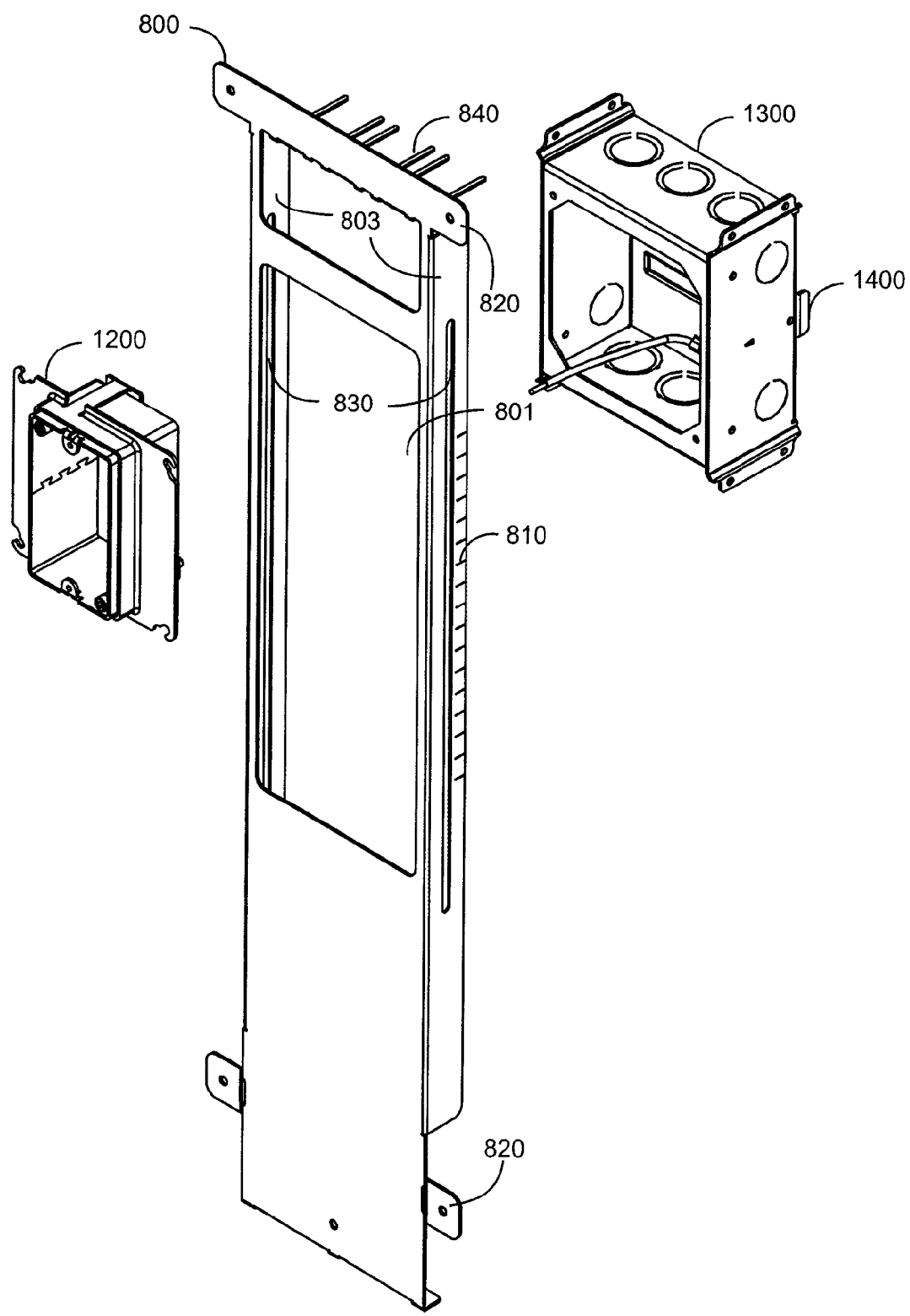
FIG. 8 is an exploded perspective view of a floor bracket assembly.

FIG. 8 illustrates a floor bracket 800 having an open front 801 and ruled sides 810. The floor bracket 800 has tabs 820 for attaching the bracket 800 to one or both of a floor joist or a wall stud. Side grooves 830 allow fasteners to attach the junction box 1300 at an adjustable height from the floor. Conduit supports 840 are adapted for attachment to conduits running to the junction box 1300. The plaster ring 1200 is attached to the box 1300 through the open front 801 so that the plaster ring 1100 can be removed from the box 1130 without removing the box 1300 from the bracket 800.

Figure 9:
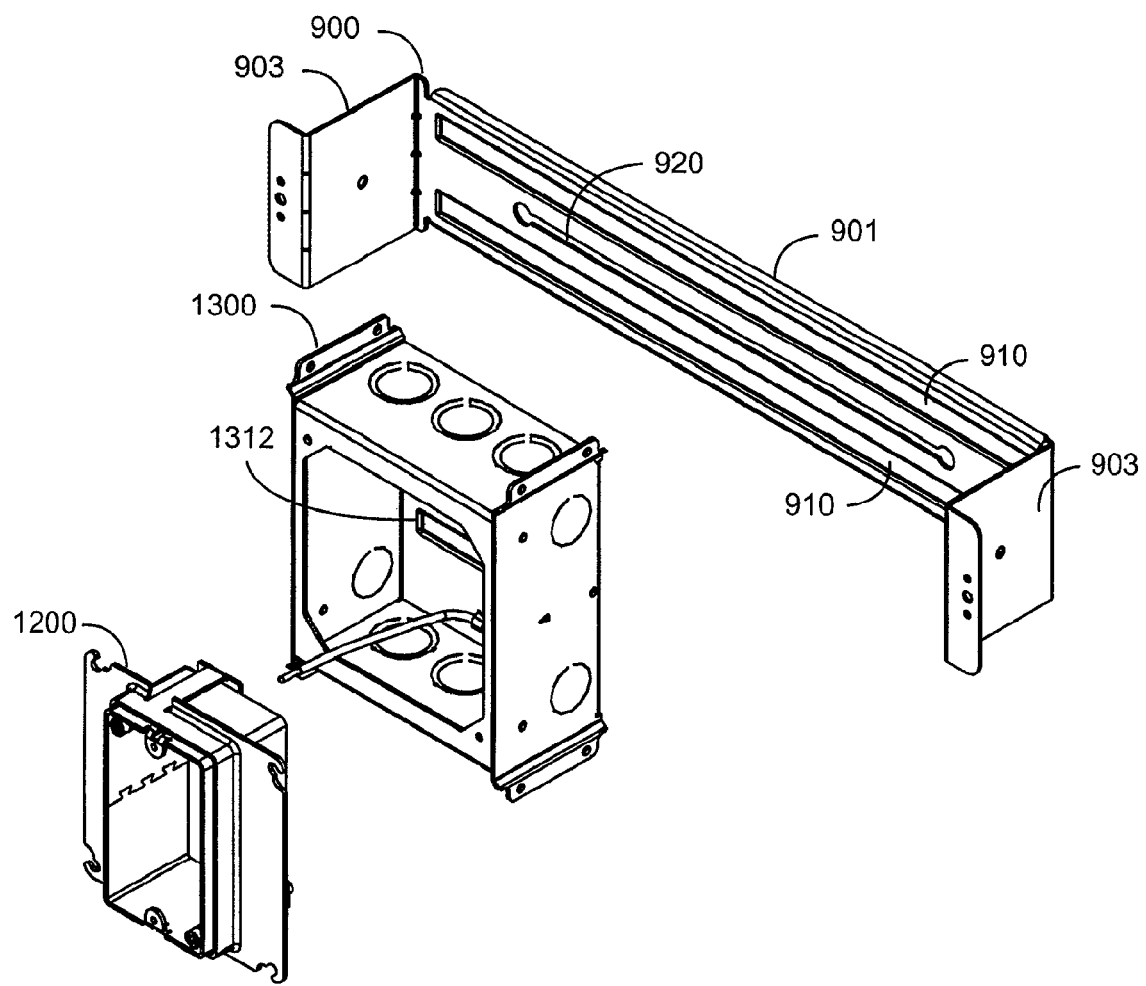
FIG. 9 is an exploded perspective view of a stud bracket assembly.
Figure 13:
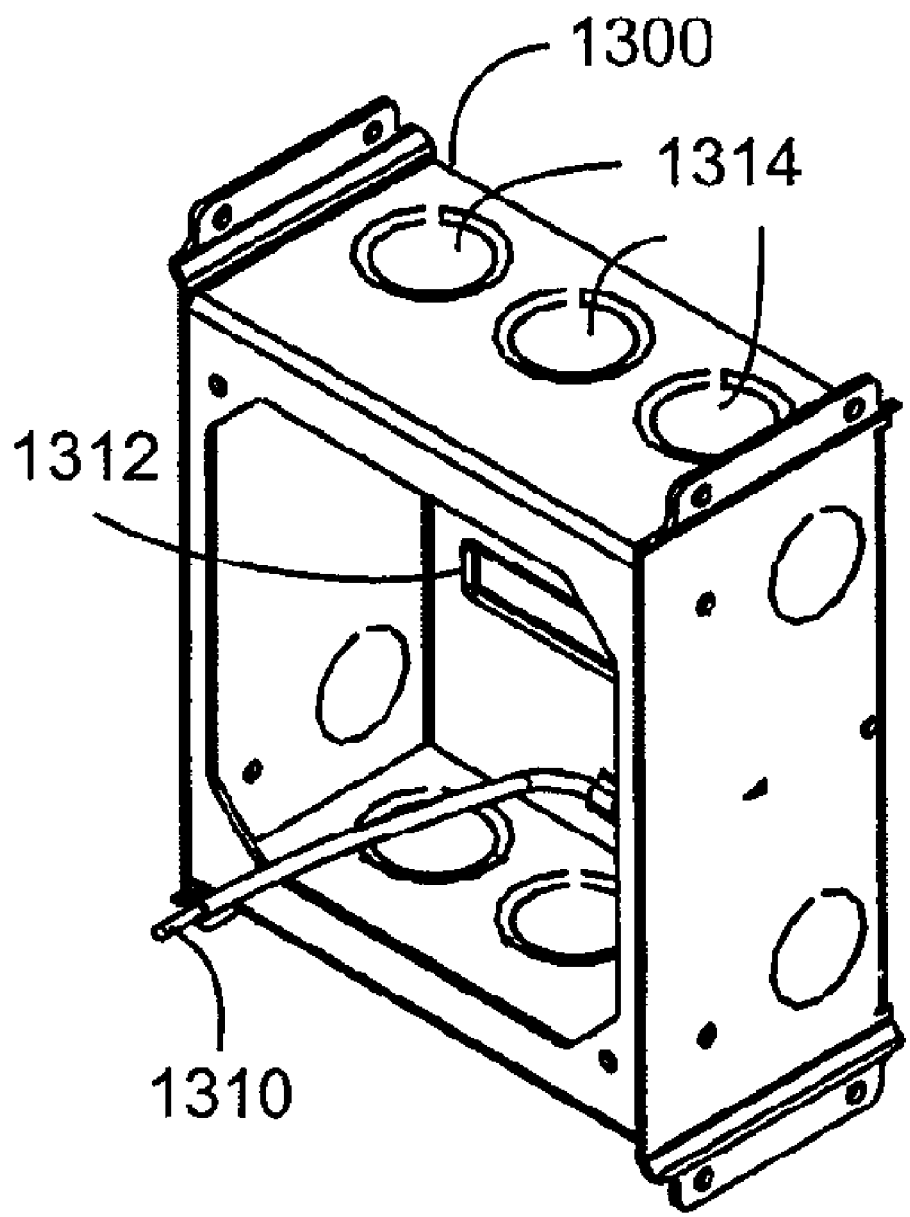
FIG. 13 is a perspective view of a junction box.
Figure 14A:
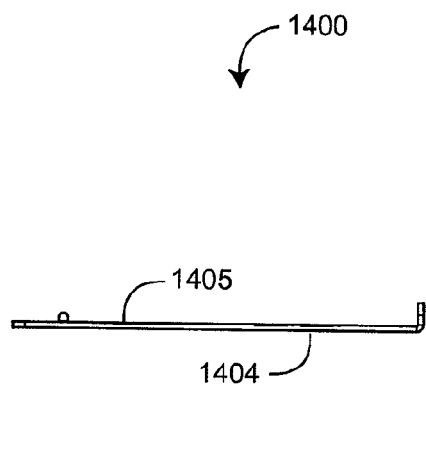
FIGS. 14A-D are top, perspective, front and side views, respectively, of a support arm.
Figure 14B:
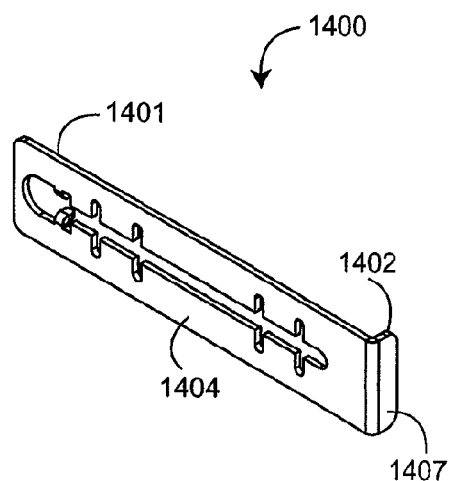
Figure 14C:
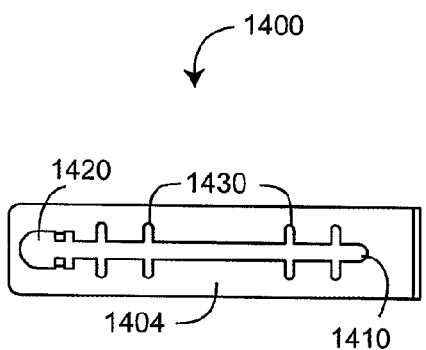
Figure 14D:
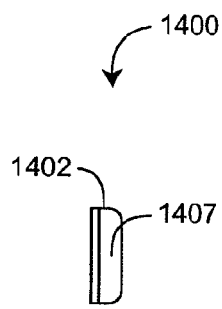

FIG. 9 illustrates a stud bracket 900 having a horizontal bar 901 and ends 903. The ends 903 are folded perpendicularly to the bar 901 and adapted to secure the bracket 900 horizontally between wall studs. The bar 901 has grooves 910 and a slot 920 that extend horizontally to proximate both ends 903 of the bracket 900. The grooves 910 are adapted to slideably retain corresponding box tongues 1312 (FIG. 13). The slot 920 is centered between the grooves 910 and accommodates a fastener that secures the junction box 1300 to the bracket 900 while allowing the box to slideably adjust in position along the bar 901. The plaster ring 1200 is attached to the box 1300 and can be removed from the box 1300 without removing the box 1300 from the bracket 900.

Figure 10:
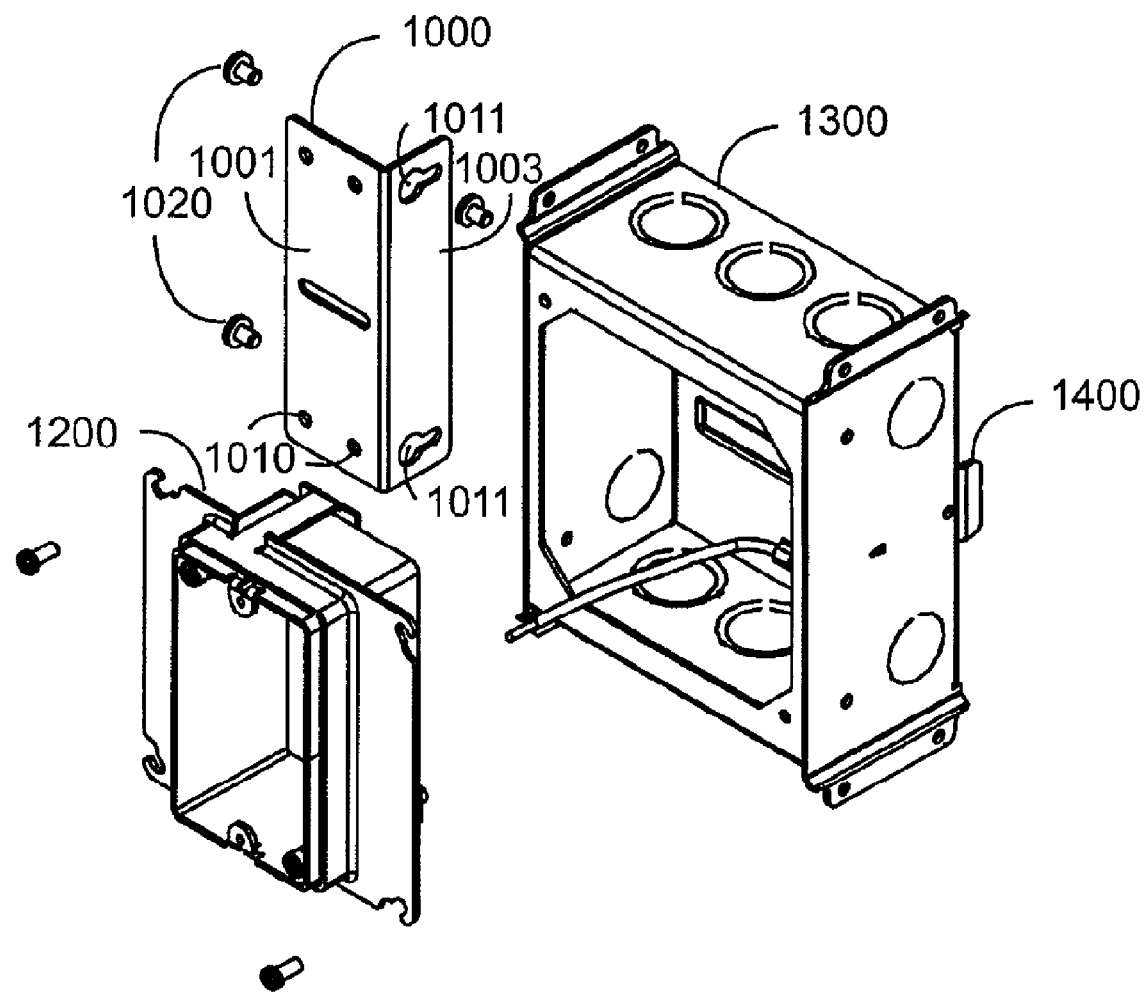
FIG. 10 is an exploded perspective view of a box bracket assembly.
Figure 11:
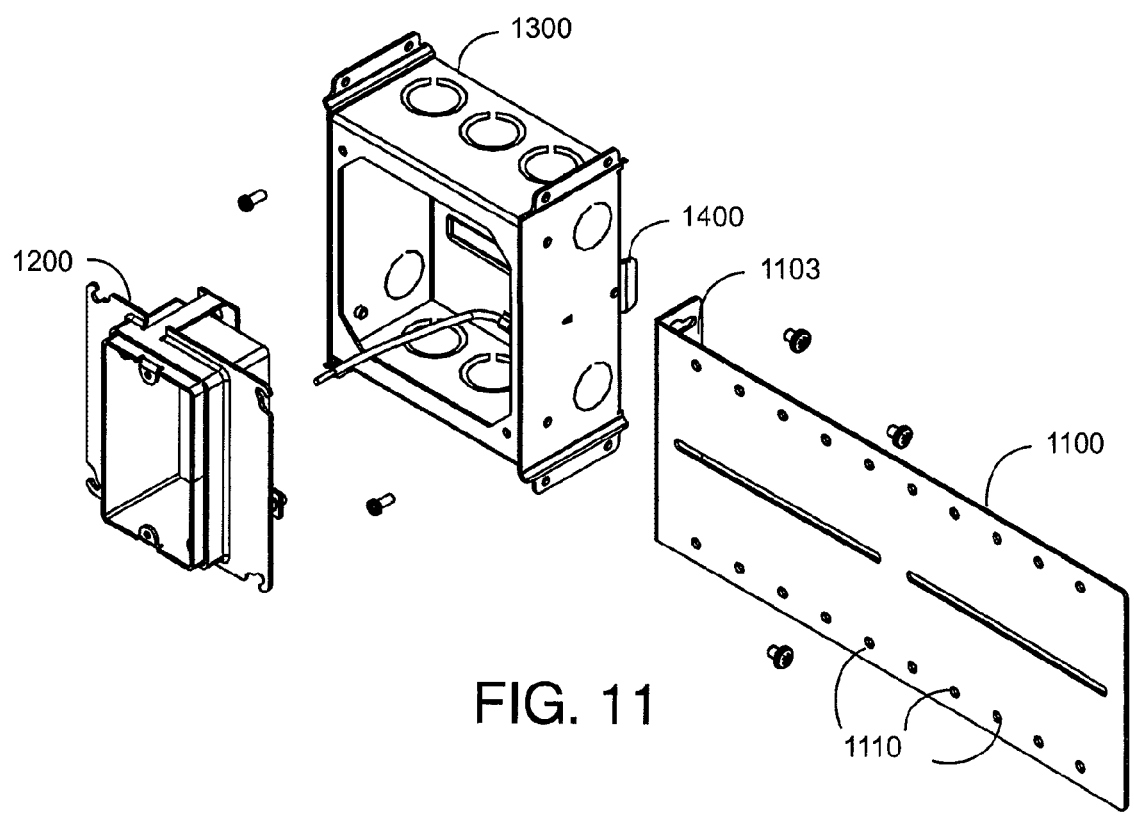
FIG. 11 is an exploded perspective view of an extended BOX bracket assembly.

FIG. 10 illustrates a box bracket 1000 having a stud mounting face 1001 and a box mounting face 1003. The stud mounting face 1001 is disposed perpendicular to the box mounting face 1003 and is adapted to fasten to a wall stud. Either side of the junction box 1300 attaches to the box mounting face 1003. The box mounting face 1003 has a keyhole slots 1011 allowing the junction box 1300 to fasten and unfasten to the bracket 1000 without removing the fasteners 1020. The stud mounting face 1001 has a plurality of mounting holes 1110 to accommodate fasteners that allow the junction box 1300 to be positioned along a stud.

FIG. 11 illustrates an extended box bracket 1100 having an extended stud mounting face 1101 and a box mounting face 1103. The box mounting face 1103 is disposed perpendicular to the extended stud mounting face 1101 and is adapted to fasten to the junction box 1300. The extended stud mounting face 1101 is adapted to fasten to a wall stud. The extended stud mounting face 1101 has a plurality of mounting holes 1110 spaced along the length of the bracket 1100 to accommodate fasteners that allows the junction box 1300 to be position vertically along a stud and horizontally between studs.

Figure 12:
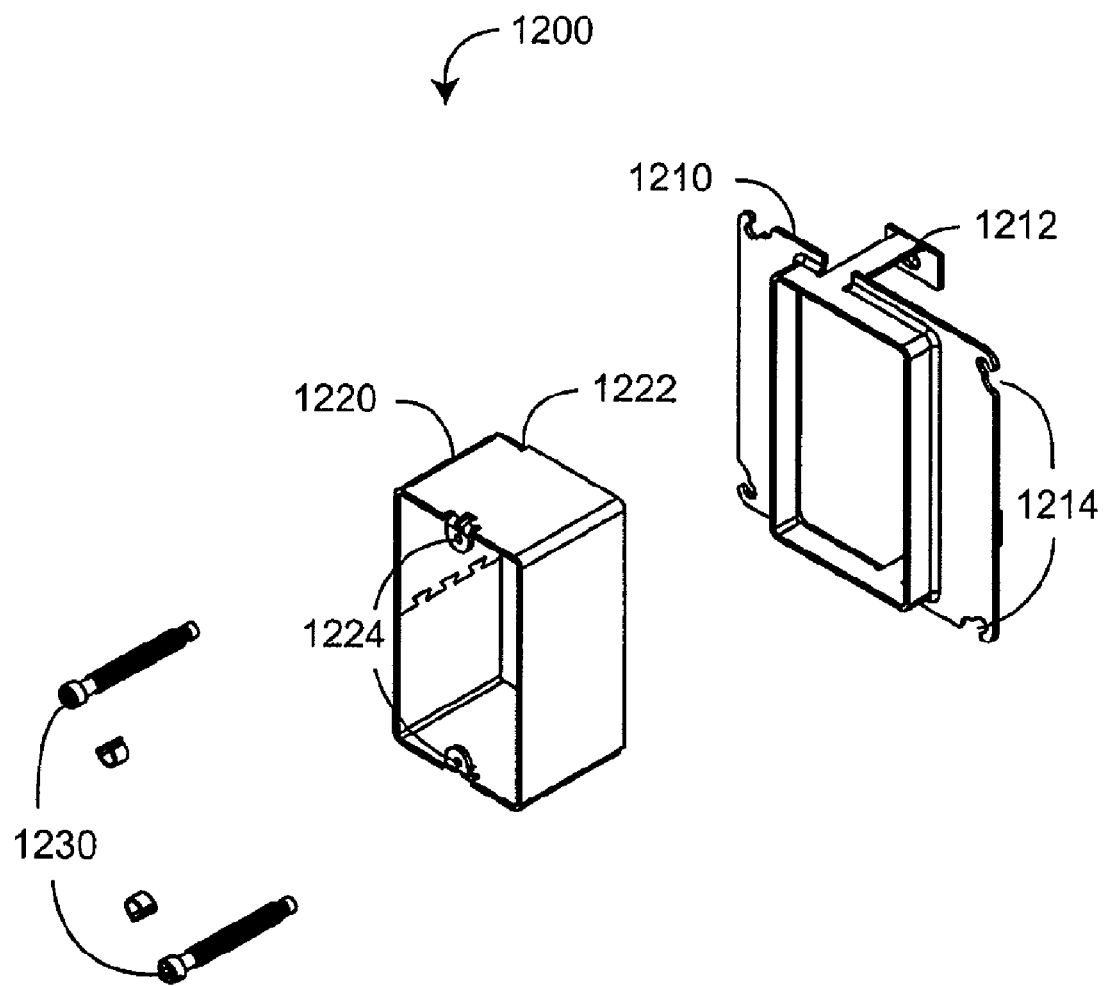
FIG. 12 is an exploded perspective view of an adjustable plaster ring.

FIG. 12 further illustrates an adjustable plaster ring 1200 having a base ring 1210, an insert ring 1220 and adjusting screws 1230. The insert ring 1220 is slideably retained by the base ring 1210 and secured to the base ring 1210 by the adjusting screws 1230. The insert ring 1220 is adapted to mount a wiring module and to adjust the wiring module position relative to the base ring 1210 in response to turning of the screws 1230. The base ring 1210 has keyhole slots 1214 adapted to accommodate fasteners that attach the plaster ring 1200 to a junction box. The keyhole slot 1214 allows the plaster ring 1200 to fasten and unfasten to the junction box without removing the fasteners.

FIG. 13 further illustrates a junction box 1300 having a ground wire 1310, a tongue 1312 and knockouts 1314. The ground wire 1310, being pre-wired to the box, advantageously saves a fabrication step on the job site. Further, the ground wire 1310 is configured to insert into a push-wire connector on a pre-wired wiring module, providing a plug-in function module with a path to ground. The tongue 1312 stabilizes the box within a groove on a stud bracket, if used. The knockouts 1314 provide attachment points for power cable conduits.

FIGS. 14A-D further illustrate a support arm 1400 adapted to attach to a back face of the junction box 1300 (FIG. 13) and provide support against an inside wall surface. In particular, the support arm 1400 has an attachment section 1401 and a support section 1402 extending generally perpendicularly from one end of the attachment section 1401. The attachment section is generally planar having an inside face 1404 that is disposed against the junction box 1300 and an opposite outside face 1405 that is disposed distal the junction box 1300. The support section 1402 has a support face 1407 that is disposed against an inside wall surface. The attachment section 1401 has an adjustment slot 1410, a fastener hole 1420, and a plurality of bending slots 1430 distributed along and extending perpendicularly across the adjustment slot 1410. The attachment section 1401 is configured to bend along one of the bending slots 1430 so as to provide a variable length support extending generally normal to the junction box back face. The support arm 1400 is held to the box 1300 with a fastener that is slideable along the adjustment slot 1410, providing an adjustable support arm position.

A universal electrical wiring component has been disclosed in detail in connection with various embodiments. These embodiments are disclosed by way of examples only and are not to limit the scope of the claims that follow. One of ordinary skill in the art will appreciate many variations and modifications.

What is claimed is:

1. A modular electrical wiring component comprising:
   a wiring module having a first portion configured to couple to a source of electrical power and a second portion configured to couple and provide the electrical power to a separate functional module that provides a selected electrical distribution function, wherein the wiring module is configured to couple to the functional module without accessing the wiring first portion;
   an adjustable plaster ring configured to couple to the wiring module and to an electrical box, wherein the adjustable plaster ring is configured to provide a variable distance between the electrical junction box and the wiring module; and
   a protective cover to shield the second portion of the wiring module when no functional module is coupled to the wiring module.

2. The modular electrical wiring component of claim 1, wherein the adjustable plaster ring comprises a base ring and an insert ring that is slidably retained within the base ring.

3. The modular electrical wiring component of claim 2, wherein the insert ring is slidably retained within the base ring by adjusting screws.

4. The modular electrical wiring component of claim 3, wherein turning the adjusting screws varies the distance between the electrical box and the wiring module.

5. The modular electrical wiring component of claim 2, wherein the base ring is configured to couple to the electrical box and the insert ring is configured to couple to the wiring module.

6. The modular electrical wiring component of claim 1, wherein the wiring module is configured to accept a plug-in functional module.

7. The modular electrical wiring component of claim 1, further comprising the electrical box.

8. An electrical wiring method comprising:
   providing a wiring module having a first portion configured to couple to a source of electrical power and a second portion configured to couple and provide electrical power to a functional module that provides a selected electrical distribution function, wherein the wiring module is configured to couple to the functional module without accessing the first portion;
   providing an adjustable plaster ring configured to couple to the wiring module and to an electrical box, wherein the adjustable plaster ring is configured to provide a variable distance between the electrical junction box and the wiring module;
   coupling the wiring module to the adjustable plaster ring; and
   coupling a protective cover with respect to the wiring module so as to shield the second portion of the wiring module when no functional module is coupled to the wiring module.

9. The electrical wiring method of claim 8, further comprising mechanically coupling the adjustable plaster ring to the electrical box.

10. The electrical wiring method of claim 9, further comprising adjusting the distance between the electrical box and the wiring module using the adjustable plaster ring.

11. The electrical wiring method of claim 8, further comprising electrically and mechanically coupling the functional module to the wiring module.

12. The electrical wiring method of claim 11, wherein electrically and mechanically coupling the functional module to the wiring module comprises plugging the functional module into the second portion of the wiring module.

* * * * *